(12) United States Patent
Li et al.

(10) Patent No.: US 12,253,417 B2
(45) Date of Patent: Mar. 18, 2025

(54) MULTI-WAVELENGTH SPECTRAL THERMOMETRY BASED ON MOBILE NARROW-BAND WINDOW AND OPTIMIZATION

(71) Applicant: China University of Mining and Technology, Jiangsu (CN)

(72) Inventors: Kuangyu Li, Jiangsu (CN); Han Guo, Jiangsu (CN); Huaichun Zhou, Jiangsu (CN); Bo Yu, Jiangsu (CN); Xianyong Peng, Jiangsu (CN); Zhuoran Jing, Jiangsu (CN); Kun Yang, Jiangsu (CN)

(73) Assignee: China University of Mining and Technology, Jiangsu (CN)

( * ) Notice: Subject to any disclaimer, the term of this patent is extended or adjusted under 35 U.S.C. 154(b) by 0 days.

(21) Appl. No.: 18/563,877

(22) PCT Filed: Dec. 23, 2022

(86) PCT No.: PCT/CN2022/141254
§ 371 (c)(1),
(2) Date: Nov. 23, 2023

(87) PCT Pub. No.: WO2024/098523
PCT Pub. Date: May 16, 2024

(65) Prior Publication Data
US 2024/0418574 A1   Dec. 19, 2024

(30) Foreign Application Priority Data
Dec. 21, 2022  (CN) .......................... 202211646850.X

(51) Int. Cl.
*G01J 5/48*   (2022.01)
*G01J 5/53*   (2022.01)

(52) U.S. Cl.
CPC .. *G01J 5/48* (2013.01); *G01J 5/53* (2022.01)

(58) Field of Classification Search
CPC ...................................... G01J 5/48; G01J 5/56
See application file for complete search history.

(56) References Cited

U.S. PATENT DOCUMENTS

2010/0246631 A1* 9/2010 Barlett ................... G01J 5/026
374/2

FOREIGN PATENT DOCUMENTS

| CN | 104864977 | 8/2015 |
|---|---|---|
| CN | 107423537 | 12/2017 |

(Continued)

OTHER PUBLICATIONS

Zhou, CN 101403639—English Translation (Year: 2009).*

(Continued)

*Primary Examiner* — Michael J Dalbo
(74) *Attorney, Agent, or Firm* — JCIPRNET

(57) ABSTRACT

The present invention provides a multi-wavelength spectral thermometry based on mobile narrow-band window and optimization and belongs to the field of thermal radiation temperature detection. A continuous spectrum of a thermal radiation object is collected by a spectrometer; the spectrum of the thermal radiation object is denoised, windowed and standardized; the whole detection wavelength range is traversed within an appropriate narrow-band window; through comparison with windowed and standardized black-body radiation spectra at different temperatures in a corresponding spectral window, the temperature and emissivity distribution of the thermal radiation object is calculated with high accuracy without depending on emissivity model estimation, and high universality and noise resistance are achieved.

4 Claims, 4 Drawing Sheets

(56) References Cited

FOREIGN PATENT DOCUMENTS

| CN | 111551255 | 8/2020 |
|---|---|---|
| CN | 112834051 | 5/2021 |
| CN | 112964366 | 6/2021 |
| CN | 114509165 | 5/2022 |
| CN | 115014775 | 9/2022 |
| CN | 115031854 | 9/2022 |

OTHER PUBLICATIONS

Jiang, A simple measurement method of temperature and emissivity of coal-fired flames from visible radiation image and its application in a CFB boiler furnace, Fuel 88 (2009) 980-987. (Year: 2009).*

Zhi-Yong Peng et al., "Method of imaging performance deterioration anlysis and its experiment simulated high heating sapphire MW infrared window during near-hypersonic flight", Acta Phys. Sin., Dec. 15, 2013, with English abstract, pp. 230702-1-230702-10, vol. 62, No. 23.

"International Search Report (Form PCT/ISA/210) of PCT/CN2022/141254", mailed on Sep. 8, 2023, pp. 1-5.

"Written Opinion of the International Searching Authority (Form PCT/ISA/237) of PCT/ CN2022/141254", mailed on Sep. 8, 2023, with English translation thereof, pp. 1-9.

\* cited by examiner

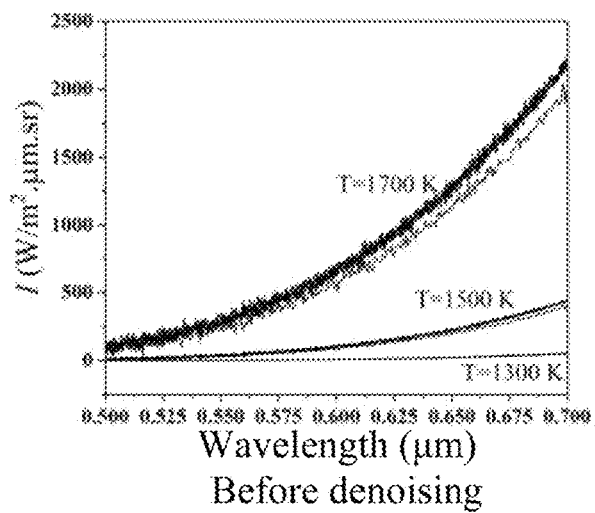
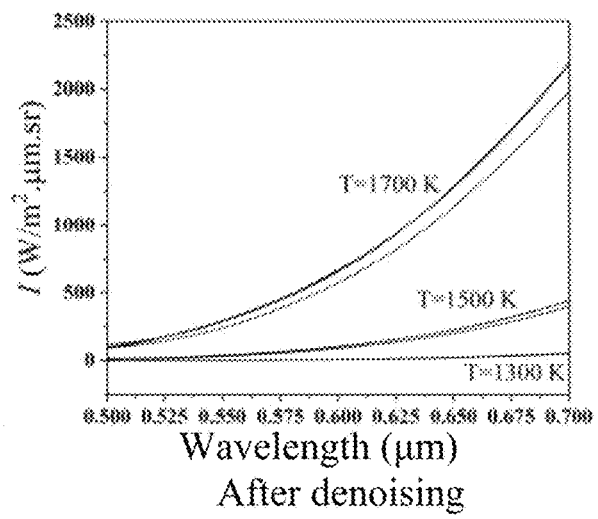
FIG. 3A  FIG. 3B
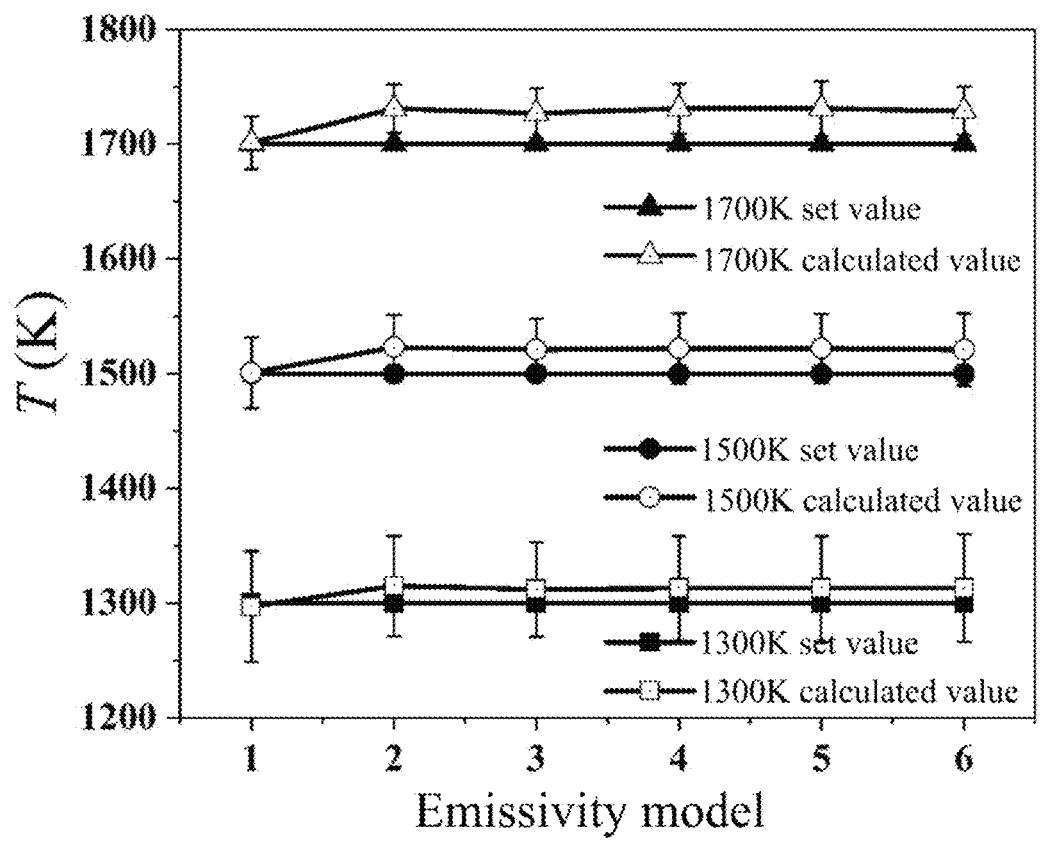
FIG. 4

Wavelength (μm)
Before denoising

Wavelength (μm)
After denoising

MULTI-WAVELENGTH SPECTRAL THERMOMETRY BASED ON MOBILE NARROW-BAND WINDOW AND OPTIMIZATION

CROSS-REFERENCE TO RELATED APPLICATION

This application is a 371 of international application of PCT application serial no. PCT/CN2022/141254, filed on Dec. 23, 2022, which claims the priority benefit of China application no. 202211646850.X, filed on Dec. 21, 2022. The entirety of each of the above mentioned patent applications is hereby incorporated by reference herein and made a part of this specification.

TECHNICAL FIELD

The present invention belongs to the field of thermal radiation temperature detection, and relates to a multi-wavelength spectral thermometry based on mobile narrow-band window and optimization.

BACKGROUND

As a non-contact thermometry, spectral thermometry is widely applied in the field of high-temperature detection due to the compactness of a device structure and the advantage of in-situ on-line measurement. Spectral thermometry can usually be divided into single-wavelength, dual-wavelength and multi-wavelength. Single-wavelength spectral thermometry requires calculating the temperature of a thermal radiation object at a specific wavelength, and the calculation process requires knowing the spectral emissivity of the thermal radiation object at the wavelength. Dual-wavelength and multi-wavelength spectral thermometry does not require knowing the spectral emissivity, but requires the spectral emissivity distribution characteristic of the thermal radiation object. In the documents, gray hypothesis is usually used during dual-wavelength spectral thermometry, a polynomial function emissivity model or other empirical emissivity models are used during multi-wavelength spectral thermometry, and the temperature of the thermal radiation object can be detected under the condition that the spectral emissivity is unknown.

In the multi-wavelength spectral thermometry process, the deviation in estimating the spectral emissivity distribution characteristic of the thermal radiation object will affect the accuracy of thermometry. The emissivity distribution characteristic of the thermal radiation object will change with the change of material type, surface roughness, physical and chemical structure, thickness, phase state and temperature. A single function model cannot accurately describe the emissivity distribution characteristic of the thermal radiation object in different states. Therefore, it is urgent to develop a spectral thermometry method without depending on the estimation of the emissivity distribution characteristic, thereby improving the universality, accuracy and noise resistance of the spectral thermometry for different thermal radiation objects.

SUMMARY

The problem to be solved by the present invention is to overcome the defects in the prior art and provide a multi-wavelength spectral thermometry based on mobile narrow-band window and optimization. A continuous spectrum of a thermal radiation object is collected by a spectrometer; the spectrum of the thermal radiation object is denoised, windowed and standardized; the whole detection wavelength range is traversed within an appropriate narrow-band window; through comparison with the corresponding radiation spectra, the temperature and emissivity distribution of the thermal radiation object is calculated with high accuracy without depending on emissivity model estimation, and high universality and noise resistance are achieved.

A multi-wavelength spectral thermometry based on mobile narrow-band window and optimization includes the following steps:
(1) collecting a continuous spectrum signal of a thermal radiation object by a spectrometer;
(2) performing radiation calibration on the spectrometer by taking a black-body furnace as a standard radiation source, collecting a relative spectral radiation intensity of a radiation object to be measured at each wavelength, and calculating a corresponding original spectral radiation intensity;
(3) denoising, windowing and standardizing the spectral radiation intensity; and
(4) calculating a temperature and an emissivity of the thermal radiation object.

In step (1), the collected relative spectral radiation intensity $I_{rel}$ is expressed as:

$$I_{rel}(\lambda_i) = \frac{ADC(\lambda_i)}{\tau}, i = 1, 2, 3 \ldots, m \qquad (1)$$

In the formula, ADC is an electrical signal collected by the spectrometer, $\tau$ is a set exposure time during collection, $\lambda_i$ is a central wavelength of a spectrum signal that can be received by each signal channel of the spectrometer, and m is the number of signal channels.

The emissivity of the black-body furnace is taken as 1, and the spectrometer collects a relative spectral radiation intensity $I_{b,\ rel}$ of the black-body furnace at different temperatures, expressed as:

$$I_{b,rel}(\lambda_i, T_{b,j}) = \frac{ADC(\lambda_i, T_{b,j})}{\tau}, i = 1, 2, 3 \ldots, m, \qquad (2)$$
$$j = 1, 2, 3, \ldots, n$$

In the formula, $T_{b,j}$ is a set value of the temperature of the black-body furnace, and n represents a set number of the temperatures; and
the spectral radiation intensity $I_b$ of the black-body furnace at a set temperature $T_{b,j}$ is calculated by the following formula:

$$I_{b,rel}(\lambda_i, T_{b,j}) = \frac{c_1 \lambda_i^{-5}}{\left[\exp\left(\frac{c_2}{\lambda_i T_{b,j}}\right) - 1\right]\pi}, i = 1, 2, 3 \ldots, m, \qquad (3)$$
$$j = 1, 2, 3, \ldots, n.$$

In step (2), a method for calculating the corresponding original spectral radiation intensity is to express a relationship between the spectral radiation intensity I and the relative spectral radiation intensity $I_{rel}$ by the following formula:

$$I(\lambda_i, T_j) = \exp\left[\begin{bmatrix} a_{i,1} & a_{i,2} & a_{i,3} & \cdots & a_{i,p+1} \end{bmatrix} \times \begin{bmatrix} 1 \\ \ln[I_{rel}(\lambda_i, T_j)] \\ \{\ln[I_{rel}(\lambda_i, T_j)]\}^2 \\ \vdots \\ \{\ln[I_{rel}(\lambda_i, T_j)]\}^p \end{bmatrix}\right] \quad (4)$$

In the formula, p is a polynomial order; for the same signal channel. The spectral radiation intensity $I_b$ and the relative spectral radiation intensity $I_{b,\,rel}$ of the black-body furnace at different temperatures are brought into the formula (4), and an undetermined coefficient α corresponding to the signal channel is obtained through least square fitting; and the collected relative spectral radiation intensity $I_{rel}(\lambda_i)$ of the thermal radiation object to be measured at each wavelength is brought into the formula 4 to calculate the corresponding original spectral radiation intensity $I_{raw}(\lambda_i)$.

In step (3), the denoising method is to perform local regression for denoising by weighted linear least squares and a first-order polynomial model; a residual between a spectral radiation intensity $I_{sm}(s)=[I_{sm}(\lambda_1, s), I_{sm}(\lambda_2, s), I_{sm}(\lambda_3, s), \ldots, I_{sm}(\lambda_m, s)]$ after denoising with a denoising span being S and the original spectral radiation intensity $I_{raw} = [I_{raw}(\lambda_1), I_{raw}(\lambda_2), I_{raw}(\lambda_3), \ldots, I_{raw}(\lambda_m)]$ may be expressed as:

$$R_{sm}(s) = \|I_{raw} - I_{sm}(s)\|^2, \; s = 5, 7, 9 \ldots \quad (5)$$

The value of the denoising span s is referenced to an increment $\Delta R_{sm}(s)$ of the residual $R_{sm}(s)$:

$$\Delta R_{sm}(s) = R_{sm}(s) - R_{sm}(s-2) \quad (6)$$

The value of the denoising span s meets that $\Delta R_{sm}(s)$ is the minimum, in which case, the spectral radiation intensity after denoising may be expressed in a matrix form as:

$$I(i) = [I(\lambda_1, T), I(\lambda_2, T), I(\lambda_3, T), \ldots, I(\lambda_m, T)]; \quad (7)$$

The windowing method is to take the ith signal channel as a starting point when other thermal radiation objects are measured, and express the bandwidth $W_i$ of a narrow-band window comprising w+1 signal channels as:

$$W_i = \sum_{l=i}^{i+w} \Delta \lambda_l \quad (8)$$

in the formula, $\Delta \lambda_i$ is a wavelength interval between the ith signal channel and the next adjacent signal channel, and w is the number of the wavelength intervals and takes the minimum on the premise of ensuring that an algorithm has a sufficient anti-noise ability;

within the ith narrow-band window, the spectral radiation intensity collected by the spectrometer may be expressed in a matrix form as:

$$I_w(i) = [I(\lambda_i, T), I(\lambda_{i+1}, T), I(\lambda_{i+2}, T), \ldots, I(\lambda_{i+w}, T)], \quad (9)$$
$$i = 1, 2, 3, \ldots, m - w$$

The ith signal channel is taken as a starting point when other thermal radiation objects are measured, and the bandwidth $W_i$ of a narrow-band window comprising w+1 signal channels is expressed as:

$$W_i = \sum_{l=i}^{i+w} \Delta \lambda_l \quad (8)$$

in the formula, $\Delta \lambda_i$ is a wavelength interval between the ith signal channel and the next adjacent signal channel, and w is the number of the wavelength intervals and takes the minimum on the premise of ensuring that an algorithm has a sufficient anti-noise ability;

within the ith narrow-band window, the spectral radiation intensity collected by the spectrometer may be expressed in a matrix form as:

$$I_w(i) = [I(\lambda_i, T), I(\lambda_{i+1}, T), I(\lambda_{i+2}, T), \ldots, I(\lambda_{i+w}, T)], \quad (9)$$
$$i = 1, 2, 3, \ldots, m - w;$$

The standardizing method is $$I'(\lambda_i) = \begin{cases} \dfrac{I(\lambda_i)}{I(\lambda_{i+(w+1)/2+1})}, & \{w \mid w = 2k, k \in Z^+\} \\ \dfrac{I(\lambda_i)}{I(\lambda_{i+w/2}) + I(\lambda_{i+w/2+1})/2}, & \{w \mid w = 2k+1, k \in Z^+\} \end{cases} \quad (10)$$

The standardized spectral radiation intensity matrix of the thermal radiation object is:

$$I'_w(i) = [I'(\lambda_i, T), I'(\lambda_{i+1}, T), I'(\lambda_{i+2}, T), \ldots, I'(\lambda_{i+w}, T)], \quad (11)$$
$$i = 1, 2, 3, \ldots, m - w.$$

Step (4) is specifically as follows: windowing and standardizing the spectral radiation intensity of the black-body furnace at each temperature to obtain:

$$I'_{b,w}(i, j) = [I'_b(\lambda_i, T_{b,j}), \quad (12)$$
$$I'_b(\lambda_{i+1}, T_{b,j}), I'_b(\lambda_{i+2}, T_{b,j}), \ldots, I'_b(\lambda_i + w, T_{b,j})],$$
$$i = 1, 2, 3, \ldots, m - w, j = 1, 2, 3, \ldots, n$$

An index R(j) is defined as a residual between $I_{b,w}'(i, j)$ and $I_w'(i)$ within different narrow-band windows when the temperature is $T_{b,j}$, and is expressed as:

$$R(j) = \sum_{i=1}^{m-w} \|I'_w(i) - I'_{b,w}(i, j)\|^2, j = 1, 2, 3, \ldots, n \quad (13)$$

The corresponding temperature $T_{b,j}$ of the black-body furnace when the residual R(j) is the minimum is a calculated temperature T of the thermal radiation object; and also, the emissivity distribution of the thermal radiation object is calculated by the following formula:

$$\varepsilon(\lambda_i) = \frac{I(\lambda_i, T)}{I_b(\lambda_i, T)} \quad (14)$$

In the formula, $\lambda_i$ is a central wavelength of the spectrum signal that can be received by each signal channel of the spectrometer, m is the number of the signal channels. $T_{b,j}$ is a set value of the temperature of the black-body furnace, and n represents a set number of the temperatures.

In step (1), the value of the exposure time t in the collection process ensures that the electrical signal ADC collected by each signal channel of the spectrometer has a high signal-to-noise ratio and is not overexposed.

Beneficial Effects:
(1) the method for denoising the spectrum of the thermal radiation object according to the present invention can take into account both smoothness and signal quality;
(2) according to the present invention, the spectrum of the thermal radiation object is denoised, windowed and standardized, the temperature and emissivity distribution of the thermal radiation object is calculated with high accuracy and without depending on the estimation of the emissivity model after comparison with the windowed and standardized black-body radiation spectrum in the corresponding spectral window at different temperatures, and high university and noise resistance are achieved; and
(3) according to the present invention, temperature measurement is performed based on the self-radiation spectrum of the thermal radiation object, in-situ real-time measurement can be achieved and belongs to a non-contact thermometry mode, interference to the measured object is avoided, and the emissivity calculation result can further be used for calculating the concentration of the pulverized coal and correct the radiation of image thermometry.

BRIEF DESCRIPTION OF THE DRAWINGS

FIGS. 3A and 3B show constructed target spectra;
FIG. 4 shows a temperature calculation result of a constructed target spectrum.

DETAILED DESCRIPTION OF THE INVENTION

Figure 1:
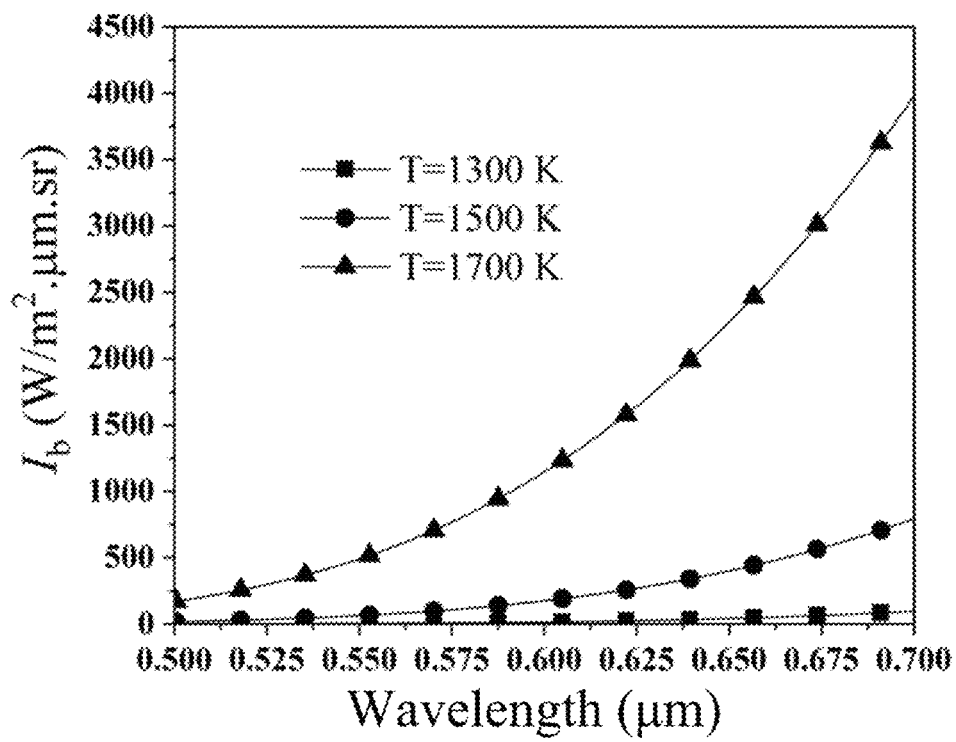
FIG. 1 shows black-body radiation spectra at three temperatures.

The technical solutions of the present invention are further described below in detail with reference to the accompanying drawings.
1. Collect a Continuous Spectrum Signal of a Thermal Radiation Object by a Spectrometer
The spectrometer collects a continuous spectrum of the thermal radiation object, and the collected relative spectral radiation intensity $I_{rel}$ may be expressed as:

$$I_{rel}(\lambda_i) = \frac{ADC(\lambda_i)}{\tau}, i = 1, 2, 3 \ldots, m \quad (1)$$

In the formula, ADC is an electrical signal collected by the spectrometer, $\tau$ is a set exposure time during collection, $\lambda_i$ is a central wavelength of a spectrum signal that can be received by each signal channel of the spectrometer, and m is the number of signal channels. It should be noted that the value of the exposure time t in the collection process should ensure that the electrical signal ADC collected by each signal channel of the spectrometer has the highest signal-to-noise ratio as possible and is not overexposed.

2. Perform Radiation Calibration on the Spectrometer
The thermometry calculation requires a standard radiation source to perform radiation calibration on the spectrometer. The present invention adopts the black-body furnace as the standard radiation source, and the emissivity of the black-body furnace is taken as 1. The spectrometer collects a relative spectral radiation intensity $I_{b, rel}$ of the black-body furnace at different temperatures, which may be expressed as:

$$I_{b,rel}(\lambda_i, T_{b,j}) = \frac{ADC(\lambda_i, T_{b,j})}{\tau}, i = 1, 2, 3 \ldots, m, \quad (2)$$
$$j = 1, 2, 3, \ldots, n$$

In the formula, $T_{b,j}$ is a set value of the temperature of the black-body furnace, and n represents a set number of the temperatures.

According to Planck's law, the spectral radiation intensity $I_b$ of the black-body furnace at a set temperature $T_{b,j}$ may be calculated by the following formula:

$$I_{b,rel}(\lambda_i, T_{b,j}) = \frac{c_1 \lambda_i^{-5}}{\left[\exp\left(\frac{c_2}{\lambda_i T_{b,j}}\right) - 1\right] \pi}, i = 1, 2, 3 \ldots, m, \quad (3)$$
$$j = 1, 2, 3, \ldots, n.$$

A relationship between the spectral radiation intensity I and the relative spectral radiation intensity $I_{rel}$ may be expressed by the following formula:

$$I(\lambda_i, T_j) = \exp[\begin{array}{ccccc} a_{i,1} & a_{i,2} & a_{i,3} & \ldots & a_{i,p+1} \end{array}] \times \begin{bmatrix} 1 \\ \ln[I_{rel}(\lambda_i, T_j)] \\ \{\ln[I_{rel}(\lambda_i, T_j)]\}^2 \\ \vdots \\ \{\ln[I_{rel}(\lambda_i, T_j)]\}^p \end{bmatrix} \quad (4)$$

In the formula, p is a polynomial order; for the same signal channel.

The spectral radiation intensity $I_b$ and the relative spectral radiation intensity $I_{b, rel}$ of the black-body furnace at different temperatures are brought into the formula (4), and an undetermined coefficient $\alpha$ corresponding to the signal channel may be obtained through least square fitting; and the collected relative spectral radiation intensity $I_{rel}(\lambda_i)$ of the thermal radiation object to be measured at each wavelength is brought into the formula (4) to calculate the corresponding original spectral radiation intensity $I_{raw}(\lambda_i)$.

3. Denoise, Window and Standardize the Spectral Radiation Intensity

1) Local regression is performed for denoising by weighted linear least squares and a first-order polynomial model. A residual between a spectral radiation intensity $I_{sm}(s)=[I_{sm}(\lambda_1, s), I_{sm}(\lambda_2, s), I_{sm}(\lambda_3, s), \ldots, I_{sm}(\lambda_m, s)]$ after denoising with a denoising span being s and the original spectral radiation intensity $I_{raw}=[I_{raw}(\lambda_1), I_{raw}(\lambda_2), I_{raw}(\lambda_3), \ldots, I_{raw}(\lambda_m)]$ may be expressed as:

$$R_{sm}(s) = \|I_{raw} - I_{sm}(s)\|^2, s = 5, 7, 9 \ldots \quad (5)$$

The value of the denoising span s is referenced to an increment $\Delta R_{sm}(s)$ of the residual $R_{sm}(s)$:

$$\Delta R_{sm}(s) = R_{sm}(s) - R_{sm}(s-2) \quad (6)$$

The value of the denoising span s meets that $\Delta R_{sm}(s)$ is the minimum, in which case, the spectral radiation intensity after denoising may be expressed in a matrix form as:

$$I(i) = [I(\lambda_1, T), I(\lambda_2, T), I(\lambda_3, T), \ldots, I(\lambda_m, T)]; \quad (7)$$

2) To eliminate the influence of the emissivity, it is necessary to window and standardize the spectral radiation intensity of the thermal radiation object within a narrow-band window during spectral thermometry.

The ith signal channel is taken as a starting point when other thermal radiation objects are measured, and the bandwidth $W_i$ of a narrow-band window including w+1 signal channels may be expressed as:

$$W_i = \sum_{l=i}^{i+w} \Delta\lambda_l \quad (8)$$

In the formula, $\Delta\lambda_i$ is a wavelength interval between the ith signal channel and the next adjacent signal channel. w is the number of the and takes the minimum on the premise of ensuring that an algorithm has a sufficient anti-noise ability.

Within the ith narrow-band window, the spectral radiation intensity collected by the spectrometer may be expressed in a matrix form as:

$$I_w(i) = [I(\lambda_i, T), I(\lambda_{i+1}, T), I(\lambda_{i+2}, T), \ldots, I(\lambda_{i+w}, T)], \quad (9)$$
$$i = 1, 2, 3, \ldots, m - w$$

3) The spectral radiation intensity of the thermal radial object is standardized within the narrow-band window:

$$I'(\lambda_i) = \begin{cases} \dfrac{I(\lambda_i)}{I(\lambda_{i+(w+1)/2+1})}, & \{w|w = 2k, k \in Z^+\} \\ \dfrac{I(\lambda_i)}{I(\lambda_{i+w/2}) + I(\lambda_{i+w/2+1})/2}, & \{w|w = 2k+1, k \in Z^+\} \end{cases} \quad (10)$$

The standardized spectral radiation intensity matrix of the thermal radiation object is:

$$I'_w(i) = [I'(\lambda_i, T), I'(\lambda_{i+1}, T), I'(\lambda_{i+2}, T), \ldots, I'(\lambda_{i+w}, T)], \quad (11)$$
$$i = 1, 2, 3, \ldots, m - w.$$

4. Calculate the Temperature and Emissivity of the Thermal Radiation Object

The spectral radiation intensity of the black-body furnace at each temperature is also windowed and standardized to obtain:

$$I'_{b,w}(i, j) = [I'_b(\lambda_i, T_{b,j}), I'_b(\lambda_{i+1}, T_{b,j}), I'_b(\lambda_{i+2}, T_{b,j}), \ldots, I'_b(\lambda_i + w, T_{b,j})], \quad (12)$$
$$i = 1, 2, 3, \ldots, m - w, j = 1, 2, 3, \ldots, n$$

An index R(j) is defined as a residual between $I_{b,w}'(i, j)$ and $I_w'(i)$ within different narrow-band windows when the temperature is $T_{b,j}$, and is expressed as:

$$R(j) = \sum_{i=1}^{m-w} \|I'_w(i) - I'_{b,w}(i, j)\|^2, j = 1, 2, 3, \ldots, n \quad (13)$$

The corresponding temperature $T_{b,j}$ of the black-body furnace when the residual R(j) is the minimum is a calculated temperature T of the thermal radiation object. In addition, the emissivity distribution of the thermal radiation object may be calculated by the following formula:

$$\varepsilon(\lambda_i) = \frac{I(\lambda_i, T)}{I_b(\lambda_i, T)} \quad (14)$$

5. Uncertainty Analysis

In this embodiment, the universality, accuracy and noise resistance of the multi-wavelength spectral thermometry based on mobile narrow-band window and optimization provided by the present invention are checked through the temperature detection on the constructed spectrum firstly. Specific steps are as follows:

1) the black-body spectral radiation intensities, corresponding to 1300 K. 1500 K and 1700 K at a wavelength of 0.5-0.7 µm, of a certain spectrometer (with a spectral resolution of about 0.584 nm) are constructed by Planck's law in the formula (3), as shown in FIG. 1.

Figure 2:
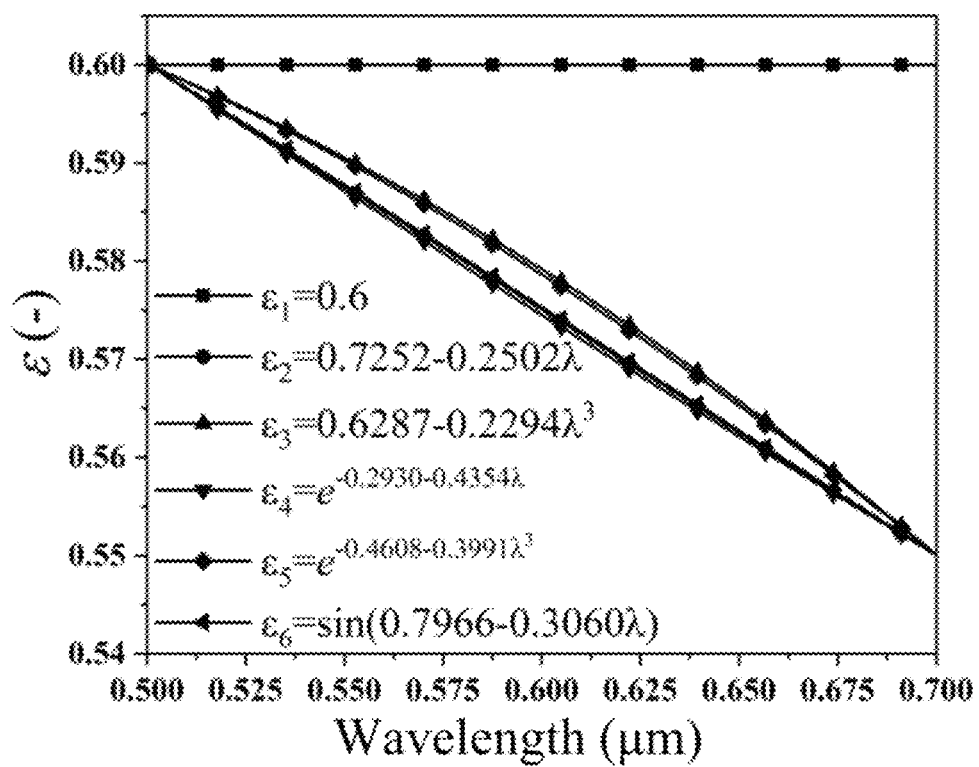
FIG. 2 shows 6 different spectral emissivity distributions.

2) Six different spectral emissivities within the corresponding wavelength range are assumed, as shown in FIG. 2.

3) The six different spectral emissivities are multiplied with the black-body radiation spectra at three temperatures in FIG. 1 respectively to obtain a total of 18 target spectra at three temperatures. To verify the noise resistance of the algorithm, 30 dB random noise is further added to the target spectra in 100 times to obtain the target spectrum with noise, as shown in FIG. 3A. By the denoising method in the present invention, the target spectrum in FIG. 3A is denoised to obtain the denoised target spectrum as shown in FIG. 3B.

4) By the multi-wavelength spectral thermometry based on mobile narrow-band window and optimization provided by the present invention, the mean and the error bar of the temperature calculation result of the target spectrum are calculated, as shown in FIG. 4. The bandwidth of the narrow-band window in the calculation process is about 16.936 nm. It can be seen from FIG. 4 that the multi-wavelength spectral thermometry based on mobile narrow-band window and optimization provided by the present invention can process the spectra with different emissivity distribution characteristics and has good universality. In case of large emissivity distribution change gradient and low signal-to-noise ratio of the constructed spectrum, the maximum detection error does not exceed 5%, and excellent accuracy and noise resistance are achieved.

Figure 5A:
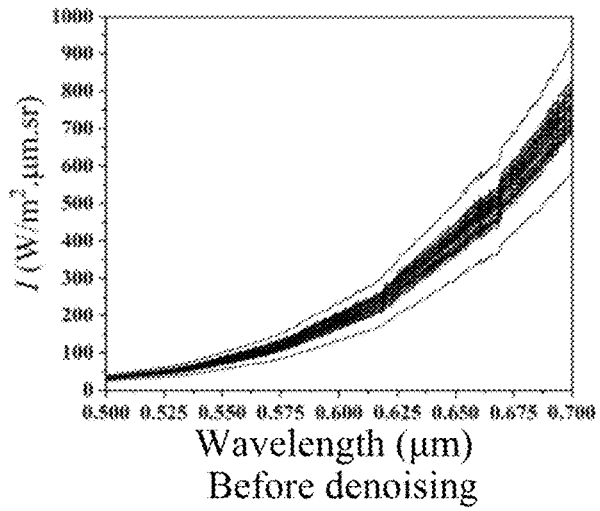
FIGS. 5A and 5B show spectra of pulverized coal flame in a hearth combustion area of a certain boiler with a load of 330 MW.
Figure 5B:
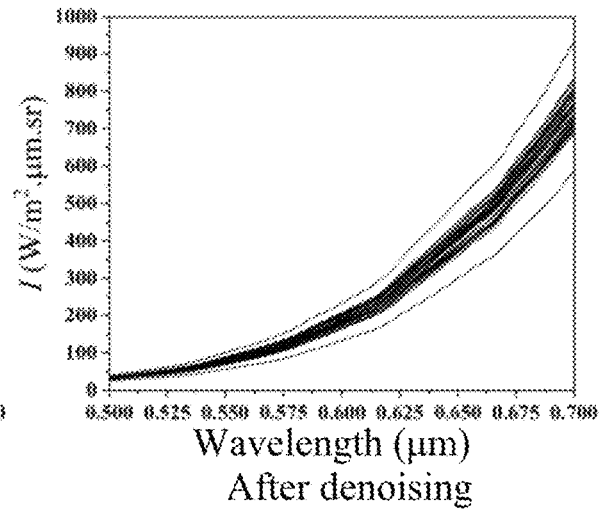
Figure 6:
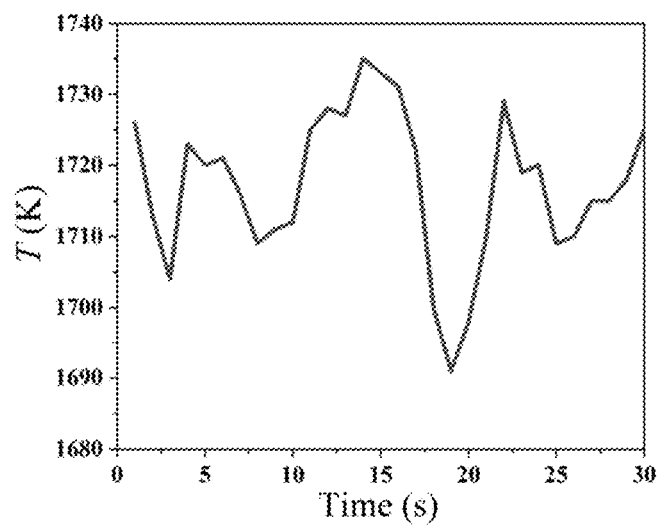
FIG. 6 shows a temperature detection result of pulverized coal flame in a hearth combustion area of a certain boiler with a load of 330 MW.
Figure 7:
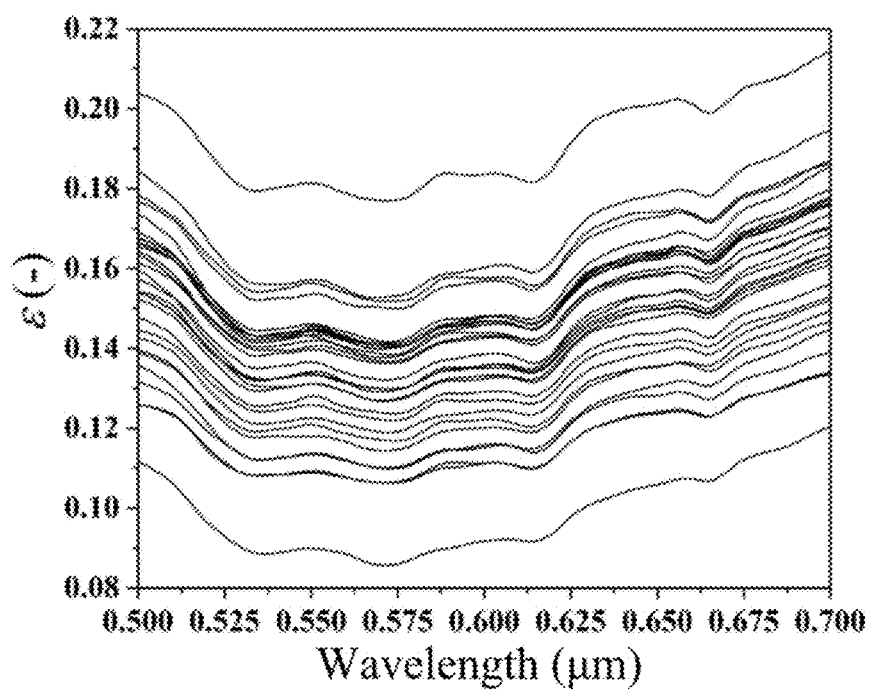
FIG. 7 shows a spectral emissivity distribution of pulverized coal flame in a hearth combustion area of a certain boiler with a load of 330 MW.

6. Measure the Combustion Temperature of Pulverized Coal Flame in an Actual Hearth Combustor Area A spectrum of pulverized coal flame of a certain boiler with a load of 330 MW and within 30 s of the hearth combustion area collected by the spectrometer of the same model in uncertainty analysis is shown in FIG. 5A. By the thermometry algorithm based on mobile narrow-band window and optimization provided by the present invention, the spectrum of the pulverized coal flame is denoised first to obtain a denoised pulverized coal flame spectrum as shown in FIG. 5B, then the denoised pulverized coal flame spectrum is windowed and standardized, and after comparison with the windowed and standardized black-body radiation spectrum at different temperatures in the corresponding spectral window, the combustion temperature of the pulverized coal flame within 30 s is obtained, as shown in FIG. 6, and the mean is 1717 K, i.e., 1444° C. The temperature of pulverized coal flame in the hearth combustion area is usually about 1500° C., and the temperature detection result in this embodiment accords with the common sense. After the temperature of the pulverized coal flame is obtained, the corresponding spectral emissivity distributions at different moments can be calculated according to the formula 14. As shown in FIG. 7, it can be seen that the spectral emissivity of the pulverized coal flame in the combustion area is reduced and then increased with the increase of the wavelength at the wavelength of 0.5-0.7 μm, and the mean is about 0.15.

What is claimed is:

1. A multi-wavelength spectral thermometry based on mobile narrow-band window and optimization, comprising the following steps:
   (1) collecting a continuous spectrum signal of a thermal radiation object by a spectrometer;
   (2) performing radiation calibration on the spectrometer by taking a black-body furnace as a standard radiation source, collecting a relative spectral radiation intensity of a radiation object to be measured at each wavelength, and calculating a corresponding original spectral radiation intensity;
   (3) denoising, windowing and standardizing the original spectral radiation intensity;
   (4) calculating a temperature and an emissivity of the thermal radiation object; and
   (5) determining a concentration of the thermal radiation object according to the emissivity of the thermal radiation object,
   wherein in step (1), the collected relative spectral radiation intensity $I_{rel}$ is expressed as:

$$I_{rel}(\lambda_i) = \frac{ADC(\lambda_i)}{\tau}, i = 1, 2, 3 \ldots, m \tag{1}$$

in the formula, ADC is an electrical signal collected by the spectrometer, τ is a set exposure time during collection, $\lambda_i$ is a central wavelength of a spectrum signal that can be received by each signal channel of the spectrometer, and m is the number of signal channels, wherein in step (2), the emissivity of the black-body furnace is taken as 1, and the spectrometer collects a relative spectral radiation intensity $I_{b,\,rel}$ of the black-body furnace at different temperatures, expressed as:

$$I_{b,rel}(\lambda_i, T_{b,j}) = \frac{ADC(\lambda_i, T_{b,j})}{\tau}, i = 1, 2, 3 \ldots, m, \tag{2}$$
$$j = 1, 2, 3, \ldots, n$$

in the formula, $T_{b,j}$ is a set value of the temperature of the black-body furnace, and n represents a set number of the temperatures; and the spectral radiation intensity $I_b$ of the black-body furnace at a set temperature $T_{b,j}$ is calculated by the following formula:

$$I_{b,rel}(\lambda_i, T_{b,j}) = \frac{c_1 \lambda_i^{-5}}{\left[\exp\left(\frac{c_2}{\lambda_i T_{b,j}}\right) - 1\right]\pi} i = 1, 2, 3 \ldots, m, \tag{3}$$
$$j = 1, 2, 3, \ldots, n,$$

wherein $c_1$ and $c_2$ are constants, wherein in step (2), a method for calculating the corresponding original spectral radiation intensity is to express a relationship between the spectral radiation intensity $I(\lambda_i, T_{b,j})$ and the relative spectral radiation intensity $I_{rel}(\lambda_i, T_{b,j})$ by the following formula:

$$I(\lambda_i, T_{b,j}) = \exp\left[\begin{bmatrix} a_{i,1} & a_{i,2} & a_{i,3} & \ldots & a_{i,p+1} \end{bmatrix} \times \begin{bmatrix} 1 \\ \ln[I_{rel}(\lambda_i, T_{b,j})] \\ \{\ln[I_{rel}(\lambda_i, T_{b,j})]\}^2 \\ \vdots \\ \{\ln[I_{rel}(\lambda_i, T_{b,j})]\}^p \end{bmatrix}\right] \tag{4}$$

in the formula, p is a polynomial order; for the same signal channel, the spectral radiation intensity $I_b(\lambda_i, T_j)$ and the relative spectral radiation intensity $I_{b,\,rel}(\lambda_i, T_j)$ of the black-body furnace at different temperatures are brought into the formula (4), replacing $I(\lambda_i, T_{b,j})$ and $I_{rel}(\lambda_i, T_{b,j})$, respectively, and an undetermined coefficient α corresponding to the signal channel is obtained through least square fitting; and the collected relative spectral radiation intensity $I_{rel}(\lambda_i, T_{b,j})$ of the thermal radiation object to be measured at each wavelength is brought into the formula 4 to calculate the corresponding original spectral radiation intensity $I_{raw}(\lambda_i, T_{b,j})$.

2. The multi-wavelength spectral thermometry based on mobile narrow-band window and optimization according to claim 1, wherein in step (3), the denoising method is to perform local regression for denoising by weighted linear least squares and a first-order polynomial model; a residual between a spectral radiation intensity $I_{sm}$, which is $I_{sm}(s)= [I_{sm}(\lambda_1, s), I_{sm}(\lambda_2, s), I_{sm}(\lambda_3, s), \ldots, I_{sm}(\lambda_m, s)]$ after denoising with a denoising span being s, wherein $I_{sm}(\lambda_1, s), I_{sm}(\lambda_2, s), I_{sm}(\lambda_3, s), \ldots, I_{sm}(\lambda_m, s)$ refer to values of $I_{sm}(s)$ at $\lambda_1 \ldots \lambda_m$, and the original spectral radiation intensity $I_{raw}=[I_{raw}(\lambda_1), I_{raw}(\lambda_2), I_{raw}(\lambda_3), \ldots, I_{raw}(\lambda_m)]$ is expressed as:

$$R_{sm}(s) = \|I_{raw} - I_{sm}(s)\|^2, s = 5, 7, 9 \ldots \quad (5)$$

the value of the denoising span s is referenced to an increment $\Delta R_{sm}(s)$ of the residual $R_{sm}(s)$:

$$\Delta R_{sm}(s) = R_{sm}(s) - R_{sm}(s-2) \quad (6)$$

the value of the denoising span s meets that $\Delta R_{sm}(s)$ is the minimum, in which case, the spectral radiation intensity after denoising is expressed in a matrix form as:

$$I(i) = [I(\lambda_1, T), I(\lambda_2, T), I(\lambda_3, T), \ldots, I(\lambda_m, T)]; \quad (7)$$

the windowing method is to take the $i^{th}$ signal channel as a starting point when other thermal radiation objects are measured, and express the bandwidth $W_i$ of a narrow-band window comprising w+1 signal channels as:

$$W_i = \sum_{l=i}^{i+w} \Delta\lambda_l \quad (8)$$

in the formula, $\Delta\lambda_i$ is a wavelength interval between the $i^{th}$ signal channel and the next adjacent signal channel, and w is the number of the wavelength intervals and takes the minimum on the premise of ensuring that an algorithm has anti-noise ability;

within the $i^{th}$ narrow-band window, a spectral radiation intensity collected by the spectrometer is expressed in a matrix form as:

$$I_w(i) = [I(\lambda_i, T), I(\lambda_{i+1}, T), I(\lambda_{i+2}, T), \ldots, I(\lambda_{i+w}, T)], \quad (9)$$
$$i = 1, 2, 3, \ldots, m-w$$

the standardizing method is $$I'(\lambda_i) = \begin{cases} \dfrac{I(\lambda_i)}{I(\lambda_{i+(w+1)/2+1})}, & \{w|w = 2k, k \in Z^+\} \\ \dfrac{I(\lambda_i)}{I(\lambda_{i+w/2}) + I(\lambda_{i+w/2+1})/2}, & \{w|w = 2k+1, k \in Z^+\} \end{cases} \quad (10)$$

wherein k is a positive integer,
the standardized spectral radiation intensity matrix of the thermal radiation object is:

$$I'_w(i) = [I'(\lambda_i, T), I'(\lambda_{i+1}, T), I'(\lambda_{i+2}, T), \ldots, I'(\lambda_{i+w}, T)], \quad (11)$$
$$i = 1, 2, 3, \ldots, m-w$$

3. The multi-wavelength spectral thermometry based on mobile narrow-band window and optimization according to claim 1, wherein the step (4) is specifically as follows: windowing and standardizing the spectral radiation intensity of the black-body furnace at each temperature to obtain:

$$I'_{b,w}(i, j) = [I'_b(\lambda_i, T_{b,j}), I'_b(\lambda_{i+1}, T_{b,j}), I'_b(\lambda_{i+2}, T_{b,j}), \ldots, I'_b(\lambda_i + w, T_{b,j})], \quad (12)$$
$$i = 1, 2, 3, \ldots, m-w, j = 1, 2, 3, \ldots, n$$

wherein $I'_{b,w}$ is a spectral radiation intensity of the black-body furnace of the black-body furnace after windowing and standardizing, $I'b(\lambda_i, T_{b,j})$ is a spectral radiation intensity of the black-body furnace with wavelength $\lambda_i$ and temperature $T_{b,j}$ of the black-body furnace after windowing and standardizing, and w is the number of the wavelength intervals and takes the minimum on the premise of ensuring that an algorithm has an anti-noise ability, an index R(j) is defined as a residual between $I_{b,w}'(i, j)$ and $I_w'(i)$ within different narrow-band windows when the temperature is $T_{b,j}$, and is expressed as:

$$R(j) = \sum_{i=1}^{m-w} \|I'_w(i) - I'_{b,w}(i, j)\|^2, j = 1, 2, 3, \ldots, n \quad (13)$$

the corresponding temperature $T_{b,j}$ of the black-body furnace when the residual R(j) is the minimum is a calculated temperature T of the thermal radiation object; and also, the emissivity distribution of the thermal radiation object is calculated by the following formula:

$$\varepsilon(\lambda_i) = \frac{I(\lambda_i, T)}{I_b(\lambda_i, T)} \quad (14)$$

in the formula, $\lambda_i$ is a central wavelength of the spectrum signal that can be received by each signal channel of the spectrometer, m is the number of the signal channels, $T_{b,j}$ is a set value of the temperature of the black-body furnace, and n represents a set number of the temperatures.

4. The multi-wavelength spectral thermometry based on mobile narrow-band window and optimization according to claim 1, wherein in step (1), the value of the exposure time τ in the collection process ensures that the electrical signal ADC collected by each signal channel of the spectrometer has a signal-to-noise ratio larger than a threshold.

* * * * *